July 27, 1926.
H. C. MICHELSEN
1,593,838
MECHANISM FOR PUMPING FUGITIVE GASES OR VAPORS
Filed March 25, 1922
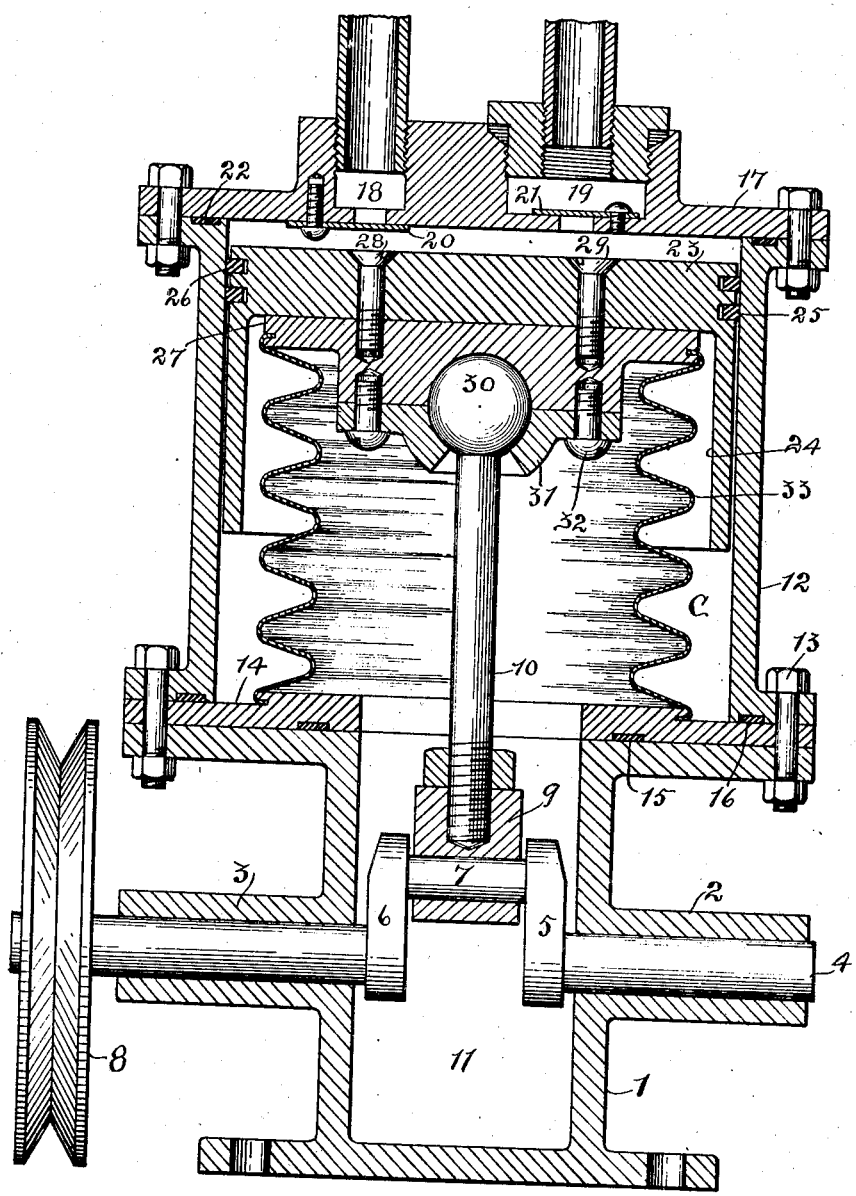
INVENTOR
BY H. C. Michelsen
Arthur Phelps Marr
ATTORNEY Patented July 27, 1926.

1,593,838

UNITED STATES PATENT OFFICE.

HENRY C. MICHELSEN, OF NEW YORK, N. Y.

MECHANISM FOR PUMPING FUGITIVE GASES OR VAPORS.

Application filed March 25, 1922. Serial No. 546,691.

This invention relates to means for pumping and is especially designed for pumping or compressing fugitive gases, gaseous liquids and vapors and has for its special object the construction of a pump or compressor wherein the piston operates in a sealed chamber.

The special objects of the invention are to prevent piston leaks and leaks in or about the cylinder or its connections.

Another object of the invention is to increase the efficiency of a pumping mechanism by so sealing the cylinder and piston that multiple piston rings with their attendant high friction resulting in friction losses and lowered efficiency therefrom are entirely overcome.

Another object of the invention is to assist or provide means for the lubrication of pistons working under high pressures or high vacuums and still other objects of the invention and the details of construction will be fully set forth as the specification progresses.

The accompanying drawing should be referred to for a complete understanding of the specification which follows.

In the drawing:

The figure is a vertical approximately mid-sectional view of my device.

Similar reference numerals indicate like parts in all the figures where they appear.

My device consists of a base and crank case 1, having extended bearings 2 and 3 in which is arranged a crank shaft 4 having cranks 5 and 6 and a crank pin 7. Upon the shaft I may secure a driving pulley 8 and upon the crank pin 7, I arrange a bearing box 9 in which is secured a piston rod 10. The crank case and especially the chamber 11 wherein the cranks operate is adapted to receive and retain oil, by means of which the crank pin and crank shaft bearings are lubricated.

Secured upon the base 1 is a cylinder 12 having flanges, by means of which and the bolts 13, the cylinder is secured to the base 1. I call attention to the disk 14 arranged between the base and the cylinder and to which I will refer later. Packing rings 15 and 16 are arranged in the lower end of the cylinder and in the ring 14 for the obvious purpose of making the junction between these parts gas tight.

At the upper end of the cylinder 12, I provide a cylinder head or cap 17 having inlet and exhaust ports 18 and 19, each provided with suitable valves 20 and 21 and while I have shown simple flapper valves, it will be understood that I may employ valves of any nature. A packing ring 22 is also arranged between the upper end of the cylinder and the cylinder head and while I realize that it is customary to gasket such parts I prefer a recessed gasket or ring as shown as being less subject to blow-out.

Arranged within the cylinder 12 is a piston 23, having a skirt 24 and a plurality of piston rings 25 and 26 are arranged in annular recesses in the piston. Secured to the piston 23 is a block 27 retained by means of the screws 28 and 29. This block is provided with a ball shaped recess, adapted to receive the ball 30 formed upon or secured to the connecting rod 10 and I provide a cap 31 secured by means of screws 32 which retains the ball 30, operatively engaged in the block 27.

In the ring 14 and block 27, I provide annular recesses and secured in these recesses by brazing, soldering or otherwise are the opposite ends of a flexible member 33. The flexible member may be formed of spun copper, properly annealed to stand compressions and expansions without fear of rupture. This member is sometimes referred to as a sylphon or breather and serves to effectively seal the space or chamber C in which the piston 23 operates, and it is within this space C that I purpose introducing glycerine or other lubricating material so that the piston will become well lubricated with each movement.

In the operation of my device the downward movement of the piston will draw gas or fluid into the cylinder, through the intake port 18 and valve 20. The upward movement of the piston will discharge the fluid or gas through the valve 21 and exhaust port 19. If the gas or fluid leaks past the piston 25 and 26 it will be confined in the chamber C and on the next downward stroke of the piston will leak back into the cylinder as it cannot escape into the atmosphere.

I call particular attention to the fact that the flexible member 33, which after all must be of somewhat delicate construction is fully contained within the cylinder and piston and cannot be reached or injured and I call further attention to the fact that should it be desirable to remove or replace the member 33, this can be readily accomplished by removing the ring 14 and block 27. Obviously this device may be made of any size and may be made in multiple units and other modifications may be made within the scope of the appended claims without departing from the principle or sacrificing the advantages of the invention.

Having carefully and fully described my invention what I claim and desire to secure is:—

1. In a compressor, a cylinder, a piston mechanism comprising a piston head engaging and operating within said cylinder and operating means extending through one end of said cylinder and a flexible, tubular bellows sealed at one edge between the crank case and said cylinder and at the other edge to the lower face of said piston head and thus operating to hermetically seal the end of said cylinder, through which said mechanism extends.

2. In a compressor, a cylinder, piston mechanism comprising a piston head engaging and operating within said cylinder and operating means extending through one end of said cylinder, and flexible, tubular means hermetically sealing the end of said cylinder through which said mechanism extends.

3. In a compressor, a cylinder, piston mechanism comprising a piston head engaging and operating within said cylinder and operating means extending from said cylinder, and flexible, tubular means hermetically sealing the opening in said cylinder through which said mechanism extends.

Signed at the city, county and State of New York, this 7th day of March, 1922.

HENRY C. MICHELSEN.